US011978576B2

(12) United States Patent
Kim et al.

(10) Patent No.: US 11,978,576 B2
(45) Date of Patent: May 7, 2024

(54) METHOD FOR PREPARING SINTERED MAGNET AND SINTERED MAGNET

(71) Applicant: LG Chem, Ltd., Seoul (KR)

(72) Inventors: In Gyu Kim, Daejeon (KR); Soon Jae Kwon, Daejeon (KR); Ik Jin Choi, Daejeon (KR); Jung Goo Lee, Daejeon (KR); Hyounsoo Uh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 718 days.

(21) Appl. No.: 15/734,080

(22) PCT Filed: Oct. 21, 2019

(86) PCT No.: PCT/KR2019/013828
§ 371 (c)(1),
(2) Date: Dec. 1, 2020

(87) PCT Pub. No.: WO2020/085738
PCT Pub. Date: Apr. 30, 2020

(65) Prior Publication Data

US 2021/0225587 A1 Jul. 22, 2021

(30) Foreign Application Priority Data

Oct. 22, 2018 (KR) ........................ 10-2018-0125899

(51) Int. Cl.
*H01F 1/057* (2006.01)
*B22F 1/102* (2022.01)
(Continued)

(52) U.S. Cl.
CPC ............ *H01F 1/0577* (2013.01); *B22F 1/102* (2022.01); *B22F 1/16* (2022.01); *H01F 41/0293* (2013.01); *B22F 2301/355* (2013.01)

(58) Field of Classification Search
CPC ............... H01F 1/0577; H01F 41/0293; H01F 41/0266; B22F 1/102; B22F 1/16; B22F 2301/355
See application file for complete search history.

(56) References Cited

U.S. PATENT DOCUMENTS 6,960,240 B2 11/2005 Hirota et al.
7,204,891 B2 4/2007 Hirota et al.
(Continued)

FOREIGN PATENT DOCUMENTS

CN 102208235 A 10/2011
CN 102982942 A 3/2013
(Continued)

OTHER PUBLICATIONS

KR-20180038745-A, Kim, machine translation (Year: 2018).*
(Continued)

*Primary Examiner* — John A Hevey
(74) *Attorney, Agent, or Firm* — Lerner David LLP

(57) ABSTRACT

A method for preparing a sintered magnet is provided according to one embodiment of the present disclosure. The method includes preparing a mixed powder by coating fluorides on a surface of magnetic powder, adding heavy rare earth hydrides to the mixed powder, and heating the mixed powder, wherein the magnetic powder includes rare earth element-iron-boron-based powder, and the fluorides include at least one of an organic fluoride or an inorganic fluoride.

11 Claims, 1 Drawing Sheet

(51) Int. Cl.
*B22F 1/16* (2022.01)
*H01F 41/02* (2006.01)

(56) References Cited

U.S. PATENT DOCUMENTS

| | | | | |
|---|---|---|---|---|
| 7,488,393 | B2 | 2/2009 | Nakamura et al. | |
| 7,488,395 | B2 | 2/2009 | Nakamura et al. | |
| 2006/0000522 | A1 | 1/2006 | Hirota et al. | |
| 2006/0213583 | A1 | 9/2006 | Nakamura et al. | |
| 2006/0213585 | A1 | 9/2006 | Nakamura et al. | |
| 2006/0222848 | A1 | 10/2006 | Satsu et al. | |
| 2008/0092994 | A1 | 4/2008 | Satsu et al. | |
| 2008/0241513 | A1* | 10/2008 | Komuro | H01F 1/0577 427/127 |
| 2010/0289366 | A1 | 11/2010 | Komuro et al. | |
| 2011/0240909 | A1* | 10/2011 | Kanda | H01F 1/0596 252/62.51 R |
| 2011/0273252 | A1 | 11/2011 | Kikugawa et al. | |
| 2013/0278104 | A1 | 10/2013 | Komuro et al. | |
| 2015/0162117 | A1 | 6/2015 | Komuro et al. | |
| 2015/0302961 | A1* | 10/2015 | Lee | H01F 1/0577 419/10 |
| 2016/0203892 | A1 | 7/2016 | Lee et al. | |
| 2019/0139686 | A1 | 5/2019 | Kim et al. | |
| 2019/0292635 | A1 | 9/2019 | In et al. | |
| 2020/0203068 | A1 | 6/2020 | Choi et al. | |

FOREIGN PATENT DOCUMENTS

| | | | | |
|---|---|---|---|---|
| CN | 105788839 | A | 7/2016 | |
| EP | 3605570 | A1 | 2/2020 | |
| JP | 2006283042 | A | 10/2006 | |
| JP | 2008266767 | A | 11/2008 | |
| JP | 2008266767 | A * | 11/2008 | C23C 18/00 |
| JP | 2010027852 | A | 2/2010 | |
| JP | 2010238712 | A | 10/2010 | |
| JP | 2010267637 | A | 11/2010 | |
| JP | 2012199423 | A | 10/2012 | |
| JP | 2014029896 | A | 2/2014 | |
| JP | 2015206116 | A | 11/2015 | |
| JP | 2017002358 | A | 1/2017 | |
| KR | 20060102480 | A | 9/2006 | |
| KR | 20060102481 | A | 9/2006 | |
| KR | 101548684 | B1 | 9/2015 | |
| KR | 20180038745 | A * | 4/2018 | H01F 41/0293 |
| KR | 20180038745 | A | 4/2018 | |
| KR | 20180038746 | A | 4/2018 | |
| KR | 20180096334 | A | 8/2018 | |
| KR | 20190062187 | A | 6/2019 | |
| WO | 2010013774 | A1 | 2/2010 | |
| WO | 2013186864 | A1 | 12/2013 | |
| WO | 2017191866 | A1 | 11/2017 | |
| WO | 2018088709 | A1 | 5/2018 | |

OTHER PUBLICATIONS

JP-2008266767-A, Matahiro, machine translation (Year: 2008).*

Chinese Search Report for Application No. 201980021163.9, dated Aug. 11, 2021, 3 pages.

Kim et al., Titled "Simultaneous application of Dy-X (X = F or H) powder doping and dip-coating processes to Nd—Fe—B sintered magnets", Acta Materialia 93, Year 2015, pp. 95-104.

Kigui et al., Titled "Research Progress in Grain Boundary Diffusion Modification, Microstructures and Properties of Sintered Nd—Fe—B Magnets", Chinese Journal of Rare Metals, vol. 42, No. 3, Mar. 2018.

Boping, H. et al., "Rare Earth Permanent Magnet Materials" Metallurgical Industry Press, Jan. 2017, p. 217, vol. 2. [Providing English Translation of Abstract only].

Search Report dated Apr. 8, 2022 from the Office Action for Chinese Application No. 201980021163.9 issued Apr. 19, 2022, pp. 1-2.

International Search Report for Application No. PCT/KR2019/013828, dated Feb. 5, 2020, pp. 1-2.

Extended European Search Report including Written Opinion for Application No. 19876705.5 dated Jun. 7, 2021, 9 pages.

* cited by examiner

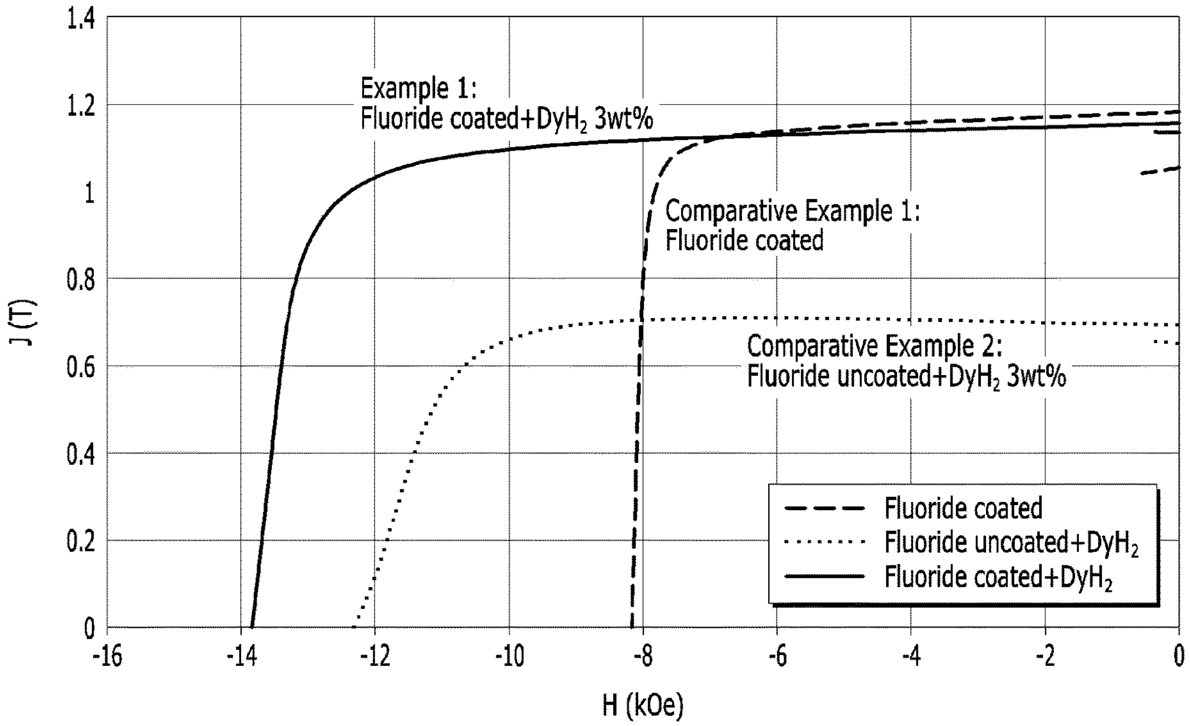
1.4
1.2
1
0.8
0.6
0.4
0.2
0
J (T)
Example 1:
Fluoride coated+DyH2 3wt%
Comparative Example 1:
Fluoride coated
Comparative Example 2:
Fluoride uncoated+DyH2 3wt%
Fluoride coated
Fluoride uncoated+DyH2
Fluoride coated+DyH2
-16
-14
-12
-10
-8
-6
-4
-2
0
H (kOe)

METHOD FOR PREPARING SINTERED MAGNET AND SINTERED MAGNET

CROSS-REFERENCE TO RELATED APPLICATION

This application is a national phase entry under 35 U.S.C. § 371 of International Application No. PCT/KR2019/013828 filed Oct. 21, 2019, which claims priority from Korean Patent Application No. 10-2018-0125899 filed on Oct. 22, 2018 with the Korean Intellectual Property Office, the disclosure of which are incorporated herein by reference in their entirety.

TECHNICAL FIELD

The present disclosure relates to a method for preparing a sintered magnet and a sintered magnet prepared thereby, and more particularly, to the method for preparing a R—Fe—B-based sintered magnet and the sintered magnet prepared thereby.

BACKGROUND OF ART

An NdFeB-based magnet is a permanent magnet having a composition of $Nd_2Fe_{14}B$, which is a compound of neodymium (Nd), i.e., a rare-earth element, iron and boron (B), and this magnet has been used as a general-purpose permanent magnet for 30 years since its development in 1983. This NdFeB-based magnet is used in various fields such as electronic information, automobile industry, medical equipment, energy, transportation, etc. In particular, with a recent trend of weight lightening and miniaturization, such magnet has been used in products such as machine tools, electronic information devices, home electronic appliances, mobile phones, robot motors, wind power generators, small motors for automobile, driving motors and the like.

It is known that the NdFeB-based magnet is generally prepared by a strip/mold casting or melt spinning method based on metal powder metallurgy. First of all, the strip/mold casting method refers to a process of melting metals such as neodymium (Nd), iron (Fe), boron (B), etc. through heat-treatment to prepare an ingot; coarsely pulverizing crystal grain particles; and preparing microparticles through a refining process. This process is repeated to obtain powder, which then undergoes a pressing and sintering process under a magnetic field to produce an anisotropic sintered magnet.

Also, the melt spinning method is performed in such a way that metal elements are melt; then poured into a wheel rotating at a high speed to be quenched; then pulverized with a jet mill; then blended with a polymer to form a bonded magnet or pressed to prepare a magnet.

The performance of magnet can be determined by magnitude of residual flux density and coercive force. An increase in the residual flux density of a NdFeB-based sintered magnet is achieved by increasing a volume ratio of $Nd_2Fe_{14}B$ compound and improving crystal orientation, and various processes have been improved so far. In order to increase the coercive force, an alloy having a composition in which a part of Nd is replaced with Dy or Tb is used. By substituting Nd of the $Nd_2Fe_{14}B$ compound with these elements, magnetic anisotropy of the compound is increased and the coercive force is also increased. However, the substitution with Dy or Tb reduces saturation magnetic polarization of the compound. Therefore, when the heavy rare earth element of Dy or Tb is added, the coercive force can be increased, but the residual flux density is inevitably lowered.

DETAILED DESCRIPTION

Technical Problem

A task to be solved by embodiments of the present disclosure is to solve the problems as above, and the embodiments of the present disclosure are to provide a method of preparing a sintered magnet and a sintered magnet prepared thereby in which heavy rare earth elements are placed at a grain boundary to minimize a decrease in magnetic flux density while increasing coercive force.

However, the task to be solved by embodiments of the present disclosure is not limited thereto, and can be variously extended within the scope of technical aspects included in the present invention.

Technical Solution

The method for preparing a sintered magnet according to one embodiment of the present disclosure includes the steps of preparing a mixed powder by coating fluorides on a surface of magnetic powder; adding heavy rare earth hydrides to the mixed powder; and heating the mixed powder, wherein the magnetic powder includes rare earth element-iron-boron-based powder, and the fluorides include at least one of an organic fluoride or an inorganic fluoride.

The organic fluoride may include at least one of perfluorinated carboxylic acid (PFCA)-based materials having 6 to 17 carbon atoms.

The organic fluoride may include perfluoro octanoic acid (PFOA).

The inorganic fluoride may include at least one of ammonium fluoride or potassium fluoride.

The rare earth element may include at least one of Nd, Pr, La, Ce, Pm, Sm or Eu.

The heavy rare earth hydrides may include at least one of $GdH_2$, $TbH_2$, $DyH_2$, $HoH_2$, $ErH_2$, $TmH_2$, $YbH_2$, or $LuH_2$.

The method may further include a step of adding rare earth hydrides to the mixed powder, wherein the rare earth hydrides may include at least one of $NdH_2$, $PrH_2$, $LaH_2$, $CeH_2$, $PmH_2$, $SmH_2$ or $EuH_2$.

The step of preparing the mixed powder may include a step of mixing the magnetic powder and the fluorides in an organic solvent, followed by drying.

The step of mixing and drying further may include a step of pulverizing the magnetic powder, the fluorides and the organic solvent.

The organic solvent may include at least one of acetone, methanol, ethanol, butanol or normal hexane.

A film of rare earth fluoride or rare earth acid fluoride may be formed at a grain boundary of the sintered magnet.

The sintered magnet may be a R—Fe—B-based sintered magnet having a composition of $R_2Fe_{14}B$, in which the R is Nd, Pr, La, Ce, Pm, Sm or Eu.

Advantageous Effects

According to the embodiments, the added heavy rare earth element is mainly located at the interface rather than primary phase by forming a fluoride film on a particle surface of magnetic powder, thereby minimizing a decrease in magnetic flux density while increasing coercive force of the sintered magnet.

In addition, it is possible to prepare magnetic powder having a high density through a lubrication action of the fluorides coated on the particle surface of the magnetic powder in a molding process before sintering.

BRIEF DESCRIPTION OF THE DRAWINGS

FIGURE is a J-H curve showing a change in magnetization (J) with respect to magnetic field (H) for each of Example 1, Comparative Example 1 and Comparative Example 2.

DETAILED DESCRIPTION OF THE EMBODIMENTS

Hereinafter, with reference to the accompanying drawings, various embodiments of the present disclosure will be described in more detail such that those skilled in the art, to which the present disclosure pertains, may easily practice the present disclosure. The present disclosure may be implemented in various different forms, and is not limited to the embodiments described herein.

Also, throughout the present specification, when any part is said to "include" or "comprise" a certain component, this means that the part may further include other components rather than excluding the other components, unless otherwise particularly specified.

Hereinafter, the method for preparing a sintered magnet and the sintered magnet according to an embodiment of the present disclosure will be described in detail.

The method for preparing a sintered magnet according to one embodiment of the present disclosure includes the steps of preparing a mixed powder by coating fluorides on a surface of magnetic powder; adding heavy rare earth hydrides to the mixed powder; and heating the mixed powder, wherein the magnetic powder includes rare earth element-iron-boron-based powder, and the fluorides include at least one of an organic fluoride or an inorganic fluoride.

According to one embodiment of the present disclosure, a mixed powder is prepared by coating fluorides on a surface of magnetic powder. The step of preparing the mixed powder may include a step of mixing the magnetic powder and the fluorides in an organic solvent, followed by drying, and specifically, may further include a step of pulverizing the magnetic powder, the fluorides and the organic solvent.

In the present disclosure, a ball mill, a turbula mixer, a spex mill, or the like may be used for mixing or pulverizing the components.

Meanwhile, the method of preparing magnetic powder according to one embodiment of the present disclosure includes a step of coating an organic fluoride on a surface of the magnetic powder. The organic fluoride includes at least one of perfluorinated carboxylic acid (PFCA)-based materials having 6 to 17 carbon atoms as a perfluorinated compound (PFC). Specifically, it is preferable to include perfluorooctanoic acid (PFOA).

Out of the PFCA-based materials, the compound having 6 to 17 carbon atoms corresponds to perfluorohexanoic acid (PFHxA, C6), perfluoroheptanoic acid (PFHpA, C7), perfluorooctanoic acid (PFOA, C8), perfluorononanoic acid (PFNA, C9), perfluorodecanoic acid (PFDA, C10), perfluoroundecanoic acid (PFUnDA, C11), perfluorododecanoic acid (PFDoDA, C12), perfluorotridecanoic acid (PFTrDA, C13), perfluorotetradecanoic acid (PFTeDA, C14), perfluoropentadecanoic acid (PFPeDA, C15), perfluorohexadecanoic acid (PFHxDA, C16), and perfluoroheptadecanoic acid (PFHpDA, 17).

The inorganic fluoride may include at least one of ammonium fluoride or potassium fluoride.

The organic solvent is not particularly limited, as long as the fluoride may be dissolved therein. However, the organic solvent may preferably include at least one selected from the group consisting of acetone, methanol, ethanol, butanol and normal hexane.

A preparation method is not particularly limited as long as the magnetic powder includes rare earth element-iron-boron-based powder. Therefore, the magnetic powder may be prepared by mechanical pulverization or hydrogen pulverization of a magnetic alloy, or by a strip cast method, but is preferably prepared by a reduction-diffusion method.

When the rare earth element-iron-boron-based powder is formed by a reduction-diffusion method, a separate pulverizing process such as coarse pulverization, hydrogen crushing, or jet milling is not required.

The rare earth element-iron-boron-based powder is synthesized by the reduction-diffusion method including a synthesizing step from raw materials and a washing step. The synthesizing step from raw materials includes the steps of uniformly mixing rare earth oxides such as neodymium oxide, raw materials such as boron and iron, and reducing agents such as Ca, and heating to form the rare earth-iron-boron-based powder by reduction and diffusion of the raw materials.

Specifically, when the powder is prepared from a mixture of rare earth oxides, boron and iron, a molar ratio of rare earth oxides, boron and iron may be 1:14:1 to 1.5:14:1. The rare earth oxides, boron and iron are raw materials for preparing $R_2Fe_{14}B$ magnetic powder, and when the molar ratio is satisfied, the $R_2Fe_{14}B$ magnetic powder can be prepared with a high yield. When the molar ratio is 1:14:1 or less, there may be a problem in that a composition of $R_2Fe_{14}B$ primary phase is changed and R-rich grain boundary phase is not formed. When the molar ratio is 1.5:14:1 or more, reduced rare earth elements may be left due to an excessive amount of rare earth elements, and the remaining rare earth elements may be changed to $R(OH)_3$ or $RH_2$.

The heat-treatment for reduction-diffusion may be performed at a temperature of 800° C. to 1100° C. under an inert gas atmosphere for 10 minutes to 6 hours. When the heat-treatment is performed for 10 minutes or less, the powder may not be sufficiently synthesized. When the heat-treatment is performed for 6 hours or more, there may be a problem in that the size of the powder becomes coarse and primary particles are formed together into lumps.

When the magnetic powder is prepared by the reduction-diffusion method, an oxide of an alkali metal or an oxide of an alkaline earth metal, which is a by-product generated in the preparation process, is formed, and a washing step for removing the by-product may further proceed. The washing step may further include the steps of removing the by-product using a quaternary ammonium-based methanol solution, and washing the powder from which the by-product has been removed with a solvent.

The rare earth element may include at least one of Nd, Pr, La, Ce, Pm, Sm or Eu.

The magnetic powder may be rare earth element-iron-boron-based powder having a composition of $R_2Fe_{14}B$, in which the R is Nd, Pr, La, Ce, Pm, Sm or Eu.

In the step of adding heavy rare earth hydrides to the mixed powder, the heavy rare earth hydrides may include at least one of $GdH_2$, $TbH_2$, $DyH_2$, $HoH_2$, $ErH_2$, $TmH_2$, $YbH_2$, or $LuH_2$.

By adding the heavy rare earth hydrides, some of the rare earth elements of the sintered magnet are replaced with a heavy rare element such as Dy or Tb. Due to the substitution, magnetic anisotropy of the sintered magnet is increased and the coercive force is also increased. However, the substitution with Dy or Tb reduces saturation magnetic polarization of the compound. Therefore, when the heavy rare earth element of Dy or Tb is added, the coercive force can be increased, but the residual flux density is inevitably lowered. However, in the method for preparing a sintered magnet according to one embodiment of the present disclosure, the magnetic powder is coated with fluorides on its surface and then sintered, thereby preventing the heavy rare earth element from penetrating R—Fe—B primary phase. Thus, the heavy rare earth element is present at a high concentration at a grain boundary rather than the primary phase of the sintered magnet. Therefore, even if a small amount of heavy rare earth hydrides is added, the coercive force is improved while minimizing a decrease in magnetic flux density. In addition, since the heavy rare earth element such as Dy or Tb is expensive, the present invention may reduce the manufacturing cost.

In general, when fluorine is added in the form of a compound such as $CuF_2$, $GaF_3$ or $DyF_3$, the magnetic flux density decreases because fluorine is added to the rare earth element-iron-boron-based composition. However, since the sintered magnet prepared according to the embodiments of the present disclosure has the fluorine in the form of a thin coating layer, it is possible to inhibit particle growth and improve corrosion resistance while minimizing a decrease in magnetic flux density. In addition, since insulating fluoride is formed on the particle surface, electrical resistance of the sintered magnet itself is increased. As a result, it is possible to prevent heat generation by inhibiting an induced current inside the sintered magnet that may be induced when used in a driving motor.

Meanwhile, the method of the present disclosure may further include a step of adding rare earth hydrides to the mixed powder in addition to the heavy rare earth hydrides, wherein the rare earth hydrides may include at least one of $NdH_2$, $PrH_2$, $LaH_2$, $CeH_2$, $PmH_2$, $SmH_2$ or $EuH_2$.

The rare earth hydride is a sintering aid, and mixed with the rare earth element-iron-boron-based powder, followed by heat treatment and sintering to form R-rich and ROx phase at a grain boundary of the sintered magnet or at a grain boundary of primary grain of the sintered magnet. This improves sinterability of the resulting sintered magnet and inhibits decomposition of primary phase. That is, sintering is performed after the addition of rare earth hydrides to prepare a high-density sintered permanent magnet having R-rich phase. Therefore, the magnetic powder and the rare earth hydrides preferably contain the same rare earth element, more preferably Nd.

Subsequently, a step of heating the mixed powder is performed for sintering.

Specifically, the mixed powder may be heated at a temperature of 1000° C. to 1100° C. for sintering. The heating may be performed for 30 minutes to 4 hours. Specifically, the mixed powder may be put in a graphite mold, followed by compression molding. Thereafter, a pulsed magnetic field may be applied to orient the powder to prepare a molded product for a sintered magnet. The molded product for a sintered magnet is heated at a temperature of 1000 to 1100° C. under vacuum to prepare a sintered magnet.

During sintering, there necessarily occurs a growth of crystal grains, which acts as a factor for decreasing coercive force. However, in one embodiment of the present disclosure, fluorides including an organic fluoride or an inorganic fluoride are dissolved in an organic solvent and then mixed with the magnetic powder, so that the fluorides are evenly coated, thereby effectively inhibiting the diffusion of materials. Thus, the growth of crystal grains in the process of sintering may be limited to a size of the initial magnetic powder. In result, a decrease in coercive force of the sintered magnet may be minimized by limiting the growth of crystal grains.

Also, a lubrication action is feasible by the fluorides and the organic solvent. A molded product for the sintered magnet having a high density may be prepared through the lubrication action, and a R—Fe—B-based sintered magnet having a high density and a high performance may be prepared by heat-treating the molded product for the sintered magnet.

Meanwhile, during heat-treatment for sintering, the magnetic powder reacts with the fluorides coated on the surface of the magnetic powder, and thus a film of rare earth fluoride or rare earth acid fluoride may be formed at a grain boundary of the sintered magnet. The rare earth acid fluoride is formed in reaction with oxygen on the surface of the magnetic powder, and thus may minimize diffusion of oxygen into the magnetic powder. Thus, a rare-earth sintered magnet having a high density may be prepared in such a way that a new oxidization reaction of magnetic particles is limited; corrosive resistance of the sintered magnet is enhanced; and a rare-earth element is suppressed from being unnecessarily consumed in oxide production.

Then, the method of preparing a sintered magnet according to the present disclosure will be described through specific Examples and Comparative Examples hereinafter.

Example 1: Ammonium Fluoride (NFU) Coated 34.35 g of $Nd_2O_3$, 69.50 g of Fe, 1.05 g of B, 0.0309 g of Cu, 0.262 g of Al and 18.412 g of Ca were uniformly mixed in a sealed plastic container with alkali metals of Na and K for controlling a particle size. Thereafter, it was evenly placed in a stainless steel container and reacted in a tube electric furnace for 30 minutes to 6 hours at a temperature of 920 to 950° C. under an inert gas (Ar) atmosphere. Then, the reaction product was pulverized with an automatic pulverizer, and residual calcium compounds were removed using an organic solvent such as ethanol or methanol and ammonium nitrate. Thereafter, 10 g of the pulverized reaction product and 0.375 g of ammonium nitrate, 125 ml of methanol, and 50 g of zirconia ball were mixed, and then pulverized and dried for 1 to 2 hours using a turbula mixer. In this way, Nd—Fe—B powder was prepared.

After removing ammonium nitrate and methanol from the Nd—Fe—B powder, 0.05 g to 0.10 g of ammonium fluoride ($NH_4F$) and 125 ml of methanol were added again to pulverize and coat for 1 to 2 hours. In this way, Nd—Fe—B powder coated with ammonium fluoride ($NH_4F$) having an average particle size of 0.5 micrometers to 20 micrometers was prepared.

7 g of $NdH_2$ and 3 g of $DyH_2$ were added to 100 g of the Nd—Fe—B powder prepared above, and then put into a graphite mold, followed by compression molding. Thereafter, a pulsed magnetic field of 5T or more was applied to orient the powder to prepare a molded product for a sintered magnet. The molded product for a sintered magnet was heated at a temperature of 1040 to 1080° C. for 1 hour to 2 hours under vacuum. Thereafter, heat treatment was performed at a temperature of 500 to 550° C. under vacuum to prepare a Nd—Fe—B sintered magnet.

Comparative Example 1: Ammonium Fluoride Coated and No Heavy Rare Earth Hydrides Nd—Fe—B powder coated with ammonium fluoride ($NH_4F$) was prepared in the same manner as in Example 1. 10 g of $NdH_2$ was added to 100 g of the Nd—Fe—B powder prepared above, and then put into a graphite mold, followed by compression molding. Thereafter, a pulsed magnetic field of 5T or more was applied to orient the powder to prepare a molded product for a sintered magnet. The molded product for a sintered magnet was heated at a temperature of 1040 to 1080° C. for 1 hour to 2 hours under vacuum. Thereafter, heat treatment was performed at a temperature of 500 to 550° C. under vacuum to prepare a Nd—Fe—B sintered magnet.

Comparative Example 2: Fluorides Uncoated and Heavy Rare Earth Hydrides Added Nd—Fe—B powder coated with ammonium fluoride ($NH_4F$) was prepared in the same manner as in Example 1, except that ammonium fluoride ($NH_4F$) was not coated. 7 g of $NdH_2$ and 3 g of $DyH_2$ were added to 100 g of the Nd—Fe—B powder prepared above, and then put into a graphite mold, followed by compression molding. Thereafter, a pulsed magnetic field of 5T or more was applied to orient the powder to prepare a molded product for a sintered magnet. The molded product for a sintered magnet was heated at a temperature of 1040 to 1080° C. for 1 hour to 2 hours under vacuum. Thereafter, heat treatment was performed at a temperature of 500 to 550° C. under vacuum to prepare a Nd—Fe—B sintered magnet.

Evaluation Example 1

FIGURE is a J-H curve showing a change in magnetization (J) with respect to magnetic field (H) for each of Example 1, Comparative Example 1 and Comparative Example 2. Referring to FIGURE, it was confirmed in Comparative Example 2 in which heavy rare earth hydrides were added that coercive force was increased, but magnetic flux density was decreased. In Comparative Example 1 in which heavy rare earth hydrides were not added, the magnetic flux density was not decreased, but the coercive force was not increased. On the other hand, it was confirmed in Example 1 that the coercive force was increased without decreasing the magnetic flux density. That is, although the same amount of heavy rare earth hydrides ($DyH_2$) were added in Example 1 and Comparative Example 2, the only difference of fluoride coating on the magnetic powder led to an increase in coercive force of the sintered magnet of Example 1 without decreasing the magnetic flux density.

Preferred Examples of the present disclosure have been described in detail as above, but the scope of the present disclosure is not limited thereto, and their various modifications and improved forms made by those skilled in the art using a basic concept of the present disclosure defined in the following claims also belong to the scope of the present disclosure.

The invention claimed is:

1. A method for preparing a sintered magnet, comprising:
preparing a mixed powder by coating fluorides on a surface of magnetic powder;
adding heavy rare earth hydrides to the mixed powder; and
heating the mixed powder to form the sintered magnet,
wherein the magnetic powder comprises rare earth element-iron-boron-based powder, and the fluorides comprise at least one of an organic fluoride or an inorganic fluoride,
wherein the organic fluoride comprises a perfluorinated carboxylic acid having 6 to 17 carbon atoms;
wherein the inorganic fluoride comprises potassium fluoride.

2. The method for preparing a sintered magnet of claim 1, wherein the organic fluoride comprises perfluoro octanoic acid (PFOA).

3. The method for preparing a sintered magnet of claim 1, wherein the rare earth element of the rare earth element-iron-boron-based powder comprises at least one of Nd, Pr, La, Ce, Pm, Sm or Eu.

4. The method for preparing a sintered magnet of claim 1, wherein the heavy rare earth hydrides comprise at least one of $GdH_2$, $TbH_2$, $DyH_2$, $HoH_2$, $ErH_2$, $TmH_2$, $YbH_2$, or $LuH_2$.

5. The method for preparing a sintered magnet of claim 1, further comprising adding rare earth hydrides to the mixed powder, wherein the rare earth hydrides comprise at least one of $NdH_2$, $PrH_2$, $LaH_2$, $CeH_2$, $PmH_2$, $SmH_2$ or $EuH_2$.

6. The method for preparing a sintered magnet of claim 1, wherein the preparing of the mixed powder comprises mixing the magnetic powder and the fluorides in an organic solvent, followed by drying.

7. The method for preparing a sintered magnet of claim 6, wherein the mixing and drying further comprises pulverizing the magnetic powder, the fluorides and the organic solvent.

8. The method for preparing a sintered magnet of claim 6, wherein the organic solvent comprises at least one of acetone, methanol, ethanol, butanol or normal hexane.

9. The method for preparing a sintered magnet of claim 1, wherein a film of rare earth fluoride or rare earth acid fluoride is formed at a grain boundary of the sintered magnet.

10. The method for preparing a sintered magnet of claim 1,
wherein the sintered magnet is a R—Fe—B-based sintered magnet having a composition of $R_2Fe_{14}B$, wherein R is Nd, Pr, La, Ce, Pm, Sm or Eu.

11. A sintered magnet prepared by the method of claim 1.

* * * * *